United States Patent [19]

Kobori et al.

[11] Patent Number: 4,866,531
[45] Date of Patent: Sep. 12, 1989

[54] RECORDING MEDIUM FEEDING APPARATUS

[75] Inventors: Masao Kobori, Mishima; Norio Takita, Shizuoka; Hideaki Fukushima, Mishima, all of Japan

[73] Assignee: Tokyo Electric Co., Ltd., Tokyo, Japan

[21] Appl. No.: 200,701

[22] Filed: May 31, 1988

[30] Foreign Application Priority Data

Dec. 11, 1986 [JP] Japan .................. 61-295210

[51] Int. Cl.$^4$ .............. H04N 1/12; H04N 1/42; H04N 1/00
[52] U.S. Cl. ................... 358/400; 358/296
[58] Field of Search ............ 358/296, 285, 256

[56] References Cited

U.S. PATENT DOCUMENTS

| 2,511,892 | 6/1950 | Wise | 358/296 |
|---|---|---|---|
| 4,061,292 | 12/1977 | Whitney | 242/201 |
| 4,280,145 | 7/1981 | Norrell | 358/285 |
| 4,667,252 | 5/1987 | Nakamura | 358/256 |
| 4,706,125 | 11/1987 | Takagi | 358/256 |
| 4,712,227 | 12/1987 | Warden | 378/173 |
| 4,748,516 | 5/1988 | Harano | 358/296 |
| 4,750,046 | 6/1988 | Chu | 358/285 |
| 4,755,835 | 7/1988 | Ogihara | 346/82 |

FOREIGN PATENT DOCUMENTS

| 58-6463 | 1/1983 | Japan . |
|---|---|---|
| 58-13064 | 1/1983 | Japan . |
| 60-13545 | 4/1985 | Japan . |
| 61-24865 | 6/1986 | Japan . |
| 61-154265 | 7/1986 | Japan . |
| 61-208969 | 9/1986 | Japan . |

Primary Examiner—James J. Groody
Assistant Examiner—Jerome Grant, II
Attorney, Agent, or Firm—Frishauf, Holtz, Goodman & Woodward

[57] ABSTRACT

A recording medium feeding apparatus used in a facsimile have a bi-directional motor and first and second one-way clutches to transmit rotational forces of the motor in the both directions to first and second feed rollers, respectively, so that these rollers move a thermal sensitive paper and a printed sheet on a printing head and an image sensor, at transmitting and reception modes of the facsimile. At a copy mode of the facsimile, the motor's rotational force in the one direction is transmitted through the first clutch to the first roller, and is not transmitted through the second clutch to the second roller but transmitted through a transmitting route switching mechanism utilizing a planet gear to the second roller.

11 Claims, 3 Drawing Sheets

RECORDING MEDIUM FEEDING APPARATUS

BACKGROUND OF THE INVENTION

1. Field of the Invention

The present invention relates to a recording medium feeding apparatus which is used in a facsimile to move a recording medium and a recording medium with an image formed thereon on printing means and over an image sensor of the facsimile, respectively, the printing means forming an image on a supplied recording medium in accordance with a received printing signal, and the image sensor reading an image which has been already printed on a recording medium and generating a printing signal which corresponds to the image read from the recording medium, and, more particularly, to a recording medium feeding apparatus used in a facsimile which can print an image, read from a recording medium with an image, on another recording medium supplied to the printing means.

2. Description of the Related Art

A facsimile, comprising an image sensor for reading an image which has been already printed on a recording medium and generating a printing signal corresponding to the image read from the recording medium, and a recording medium feeding apparatus for moving a recording medium with an image on the image sensor, is already disclosed by Japanese Patent Disclosure No. 58-13064. The conventional facsimile is of a transmission only type or a transmission/reception type, and only the image sensor and the recording medium feeding apparatus are disclosed in the drawings of the Patent Disclosure. The recording medium feeding apparatus has a pair of feed rollers, and the image sensor is interposed between the feed rollers. The feed rollers are rotated simultaneously in the same direction to move the recording medium with image on the image sensor.

A facsimile, comprising the above-mentioned image sensor, printing means for printing an image on a supplied recording medium in accordance with a supplied printing signal, and a recording medium feeding apparatus for moving the recording medium and the recording medium with image on the printing means and the image sensor, respectively, and being able to print the image read from the recording medium with an image by the image sensor on another recording medium supplied to the printing means, is already disclosed by Japanese Patent Publication Nos. 60-13545, 61-24865 and Japanese Utility Model Disclosure No. 58-6463.

The recording medium feeding apparatus for the facsimile in Japanese Patent Publication No. 60-13545 has one bi-directional driving motor, and a pair of feed rollers corresponding to the printing means and the image sensor. The feed rollers are connected to the output shaft of the driving motor through a pair of one-way clutches which operate to transmit rotational force in opposite directions. Another one-way clutch is connected to the feed roller for the image sensor, a rotational force is transmitted from the output shaft of the driving motor through an idler gear to the another one-way clutch, and the another one-way clutch is operated so as to transmit the rotational force in the same direction as the one-way clutch used for the feed roller corresponding to the printing means.

When the transmission mode is set in the facsimile disclosed in Japanese Patent Publication No. 60-13545 and constructed as described above, the output shaft of the driving motor is rotated in one direction. The rotational force in this direction is transmitted only to the feed roller for the image sensor but not transmitted to the feed roller for the printing means by the operation of the paired one-way clutches. When either the reception mode or the copy mode is set in the recording medium feeding apparatus, the output shaft of the driving motor is rotated in the other direction, the paired one-way clutches transmit the rotational force in the other direction only to the feed roller for the printing means, but do not transmit it to the feed roller for the image sensor. However, the rotational force in the other direction is also transmitted to the feed roller for the image sensor by the operation of the another one-way clutch.

Since the feed roller for the image sensor is rotated in the same direction as that at the transmission mode setting time when the reception mode is set in this case, if the reception mode is set while a recording medium with an image is placed on a tray for introducing the recording medium with the image to the feed roller for the image sensor, the recording medium with the image on the tray is fed to move on the image sensor by means of the feed roller for the image sensor. The image sensor is not operated at the reception mode setting time, but the above-mentioned feeding of the recording medium with the image at the reception mode setting time loses the operability of the facsimile. The unnecessary rotation of the feed roller for the image sensor at the reception mode setting time causes needless loading of the driving motor and consequent loss in its output.

The recording medium feeding apparatus for the facsimile, disclosed in Japanese Patent Publication No. 61-24865, also has a bi-directional driving motor and a pair of feed rollers corresponding to printing means and an image sensor, and also has a pair of one-way clutches which operate to transmit rotational force in opposite directions to the paired feed rollers. A driving gear on the output shaft of the driving motor is directly connected to the one-way clutch of the feed roller for the image sensor, and the driving gear on the output shaft of the driving motor is indirectly connected to the one-way clutch of the feed roller for the printing means through an idler gear. Another one-way clutch, which operates to transmit a rotational force in the same direction as that of the one-way clutch of the feed roller for the printing means, is further provided at the feed roller for the image sensor, and the another one-way clutch is indirectly connected to the driving gear on the output shaft of the driving motor through the idler gear The operation of the recording medium feeding apparatus for the facsimile in Japanese Patent Publication No. 61-24865 is the same as that of the recording medium feeding apparatus for the facsimile in the above-mentioned Japanese Patent Publication No. 60-13545. More specifically, at the transmission mode setting time, the output shaft of the driving motor is rotated in one direction, the rotational force in the one direction is transmitted only to the feed roller for the image sensor but not transmitted to the feed roller for the printing means by the operation of the pair of one-way clutches. Either at the reception mode setting time or copy mode setting time in the recording medium feeding apparatus for the facsimile, the output shaft of the driving motor is rotated in the other direction, the paired one-way clutches transmit the rotational force in the another direction only to the feed roller for the printing means, but does not transmit it to the feed roller for the image sensor. However, the rotational force in the other direction is transmitted also to the feed roller for the image sensor by the operation of the another one-way clutch. Therefore, the recording medium feeding apparatus for the facsimile, disclosed in Japanese Patent Publication No. 61-24865, has the same disadvantages as those of the recording medium feeding apparatus for the facsimile, disclosed in Japanese Patent Publication No. 60-13545.

A recording medium feeding apparatus for a facsimile, disclosed in Japanese Utility Model Disclosure No. 58-6463 also has a bi-directional driving motor and a pair of feed rollers corresponding to printing means and an image sensor. However, in this recording medium feeding apparatus, the paired feed rollers are connected to the output shaft of the driving motor only through a pair of one-way clutches which operate to transmit rotational force in opposite directions to the paired feed rollers.

At the transmission mode setting time in the recording medium feeding apparatus, the output of the driving motor is rotated in one direction, the rotational force in the one direction is transmitted only to the feed roller for the image sensor but not transmitted to the feed roller for the printing means by the operation of the paired one-way clutches. At the reception mode setting time in the recording medium feeding apparatus for the facsimile, the output shaft of the driving motor is rotated in another direction, the paired one-way clutches transmit the rotational force in the another direction only to the feed roller for the printing means, but do not transmit it to the feed roller for the image sensor. At the copy mode setting time, the output shaft of the driving motor is alternately rotated in one and another directions for a predetermined time, thereby alternately rotating the feed roller for the image sensor and the feed roller for the printing means for a predetermined time. In other words, the image, partly read in a predetermined amount from the recording medium with the image by rotating the feed roller for the image sensor for a predetermined time, is temporarily stored in a memory device of small capacity, and, then, the feed roller for the printing means is rotated while the rotation of the feed roller for the image sensor is stopped for the same predetermined time as above to reproduce the partly-read image on the another recording medium mounted on the printing means by the feed roller for the printing means. This is alternately repeated to completely reproduce all the image on the recording medium with the image on another recording medium.

In the recording medium feeding apparatus for the facsimile, disclosed in Japanese Utility Model Disclosure No. 58-6463, each of the feeding speed of the recording medium with the image and the another recording medium without image at the copy mode setting time is extremely slower than those at the transmission mode setting time and reception mode setting time. Since the another recording medium is intermittently moved until all the image printed on the recording medium are completely reproduced on the another recording medium, the backlashes of a plurality of gears used in the recording medium feeding apparatus tends to cause the duplicate or discontinuity of a line not presented in the original images to occur in the images completely reproduced on the another recording medium.

In order to reduce the number of rotations of the feed roller for the image sensor and the rotation of the feed roller for the printing means to one, the number being required until all the image printed on the recording medium is completely reproduced on the another recording medium, and to prevent the duplication or discontinuity of a line, a memory device of large capacity must be employed, and the memory device of such large capacity causes the price of the facsimile to increase and the profile size of the facsimile to be enlarged. Since the image reading from the recording medium with the image by the image sensor and the printing of the read-out image on the another recording medium by the printing means cannot be simultaneously executed even when the memory device of such large capacity is employed, the feeding speed of the recording medium with the image and the another recording medium without image at the copy mode time is still slower than those at the transmission and reception mode times.

SUMMARY OF THE INVENTION

Accordingly, the object of the present invention is to provide a recording medium feeding apparatus which can eliminate the loss of the output of a driving motor and the decrease in the operability of a facsimile both of which are produced in conventional examples, and which is not necessary to employ a memory device of large capacity and high price, light in weight with only one driving motor, a simple in structure, and can simultaneously feed a recording medium with an image and a recording medium without an image in a copy setting mode at the same feeding speed as that of a recording medium with an image and another recording medium without an image either at transmission mode setting time and reception mode setting time.

The above object of the present invention is achieved by a recording medium feeding apparatus, comprising a first feed roller for moving a recording medium on a printing means of a facsimile; a second feed roller for moving a recording medium with an image on an image sensor of the facsimile; a bi-directional driving motor; a first one-way clutch interposed between the driving motor and the first feed roller to transmit the rotational force of the output shaft of the driving motor in one direction to the first feed roller so that the first feed roller is rotated for moving the recording medium on the printing means, and to interrupt the transmission of the rotational force of the output shaft of the driving motor in the other direction to the first feed roller; a second one-way clutch interposed between the driving motor and the second feed roller to interrupt the transmission of the rotational force of the output shaft of the driving motor in the one direction to the second feed roller, and to transmit the rotational force of the output shaft of the driving motor in the other direction to the second feed roller so that the second feed roller is rotated for moving the recording medium with the image on the image sensor; rotational force transmitting route switching means for selectively and directly transmitting the rotational force of the output shaft of the driving motor in the one direction to the second feed roller without through in the second one-way clutch so that the second feed roller is rotated for moving the recording medium with the image on the image sensor; and rotational force transmitting route switching control means for controlling the driving motor to rotate the output shaft thereof in the one direction and controlling the switching means not to directly transmit the rotational force of the output shaft of the driving motor in the one direction to the second feed roller without through in the second one-way clutch when the printing means in the facsimile prints an image on the supplied recording medium in accordance with the supplied printing signal, controlling the driving motor to rotate the output shaft thereof in the other direction when the image sensor reads the image printed or drawn on the recording medium with the image and generates a printing signal corresponding to the read-out image, and controlling the driving motor to rotate the output shaft thereof in the one direction and controlling the switching means to directly transmit the rotational force of the output shaft thereof in the one direction to the second feed roller without through in the second one-way clutch when an image read out from the recording medium with the image by the image sensor is printed on another recording medium supplied to the printing means.

In the recording medium feeding apparatus as described above, when the printing means in the facsimile prints an image on the supplied recording medium in accordance with the supplied image signal, the rotational force of the output shaft of the driving motor in the one direction is transmitted only to the first feed roller by means of the first one-way clutch, the switching means does not transmit the rotational force of the output shaft in the one direction to the second feed roller, and the second one-way clutch does not transmit the rotational force to the second feed roller. Therefor, the recording medium is moved on the printing means so as to be printed by the first feed roller, and the recording medium with the image is not moved on the image sensor by the second feed roller. When the image sensor reads the image printed or drawn on the recording medium and generates a printing signal corresponding to the read-out image, the rotational force of the output shaft of the driving motor in the other direction is transmitted to the second feed roller through the second one-way clutch, the switching means does not transmit the rotational force of the output shaft in the other direction to the second feed roller, and the first one-way clutch does not transmit the rotational force in the other direction to the first feed roller. Therefor, the recording medium with the image is moved on the image sensor by the second feed roller, and the recording medium is not moved by the first feed roller on the printing means so as to be printed. And, when an image read out from the recording medium with the image by the image sensor is printed on another recording medium supplied to the printing means, the rotational force of the output shaft of the driving motor in the one direction is transmitted to the first feed roller through the first one-way clutch, and the switching means directly transmits the rotational force of the output shaft in the one direction to the second feed roller without through in the second one-way clutch. Therefor, the recording medium with the image is moved on the image sensor by the second feed roller and the other recording medium is moved by the first feed roller on the printing means so as to be printed.

The above-mentioned object of the present invention is also achieved by a recording medium feeding apparatus comprising a first feed roller for moving a recording medium on a printing means of a facsimile; a second feed roller for moving a recording medium with an image on an image sensor of the facsimile; a third rotatable feed roller provided at a position separate from the image sensor to feed the recording medium with the image toward the image sensor; a bi-directional driving motor; a first one-way clutch interposed between the driving motor and the first feed roller to transmit the rotational force of the output shaft of the driving motor in one direction to the first feed roller so that the first feed roller is rotated for moving the recording medium on the printing means, and to interrupt the transmission of the rotational force of the output shaft of the driving motor in the other direction to the first feed roller; a second one-way clutch interposed between the driving motor and the second feed roller to interrupt the transmission of the rotational force of the output shaft of the driving motor in the one direction to the second feed roller, and to transmit the rotational force of the output shaft of the driving motor in the other direction to the second feed roller so that the second feed roller is rotated for moving the recording medium with the image on the image sensor; rotational force transmitting route switching means for selectively and directly transmitting the rotational force of the output shaft of the driving motor in the one direction to the second feed roller without through in the second one-way clutch, and transmitting the rotational force of the output shaft of the driving motor in the other direction to the third feed roller so that the third feed roller is rotated for moving the recording medium with the image toward the image sensor; and rotational force transmitting route switching control means for controlling the driving motor to rotate the output shaft thereof in one direction and controlling the switching means not to directly transmit the rotational force of the output shaft of the driving motor in the one direction to the second feed roller without through in the second one-way clutch when the printing means in the facsimile prints a image on the supplied recording medium in accordance with the supplied printing signal, controlling the driving motor to rotate the output shaft thereof in the other direction when the image sensor reads the image printed or drawn on the recording medium and generates a printing signal corresponding to the read-out image, and controlling the driving motor to rotate the output shaft thereof in the one direction and controlling the switching means to directly transmit the rotational force of the output shaft thereof in the one direction to the second feed roller without through in the second one-way clutch when an image read out from the recording medium with the image by the image sensor is printed on another recording medium supplied to the printing means.

In the latter recording medium feeding apparatus, when the printing means in the facsimile prints an image on the supplied recording medium in accordance with the supplied printing signal, the rotational force of the output shaft of the driving motor in the one direction is transmitted only to the first feed roller by means of the first one-way clutch, the switching means does not transmit the rotational force of the output shaft in the one direction to the second and third feed rollers, and the second one-way clutch does not transmit the rotational force in the one direction to the second feed roller. Therefor, the recording medium is moved on the printing means so as to be printed by the first feed roller, and the recording medium with the image is not fed to the image sensor and is not moved on the image sensor by the third and second feed rollers. When the image sensor reads the image printed or drawn on the recording medium and generates a printing signal corresponding to the read-out image, the rotational force of the output shaft of the driving motor in the other direction is transmitted to the second feed roller through the second one-way clutch, the switching means transmits the rotational force of the output shaft in the other direction to the third feed roller, and the first one-way clutch does not transmit the rotational force in the other direction to the first feed roller. Therefor, the recording medium with the image is fed toward the image sensor by the third feed roller and moved on the image sensor by the second feed roller. At this time, the recording medium is not moved on the printing means so as to be printed by the first feed roller. And, when an image read out from the recording medium with the image by the image sensor is printed on another recording medium supplied to the printing means, the rotational force of the output shaft of the driving motor in the one direction is transmitted to the first feed roller through the first one-way clutch, the switching means directly transmits the rotational force of the output shaft in the one direction to the second feed roller without through in the second one-way clutch, and the switching means does not transmit the rotational force of the output shaft in the one direction to the third roller. Therefor, the recording medium with the image is moved on the image sensor by the second feed roller and the other recording medium is moved on the printing means so as to be printed by the first feed roller.

DETAILED DESCRIPTION OF THE PREFERRED EMBODIMENTS

Figure 1:
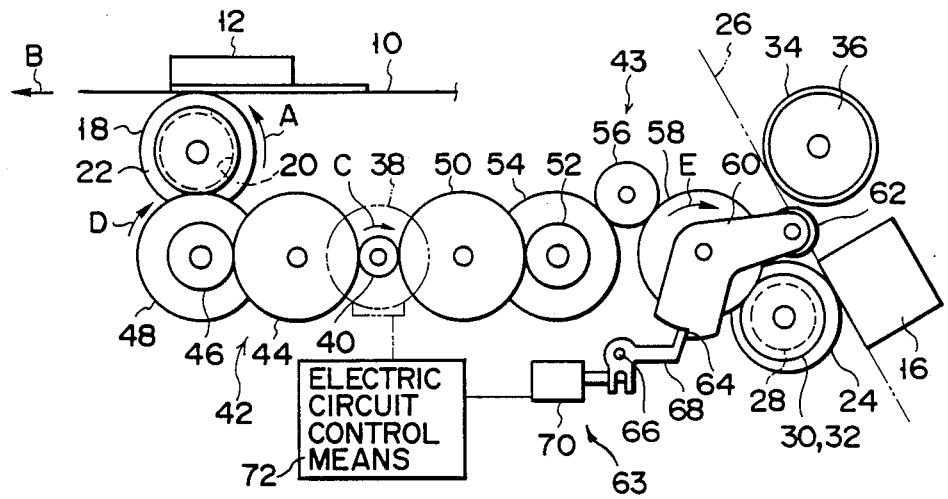
FIG. 1 is a schematic side view of a recording medium feeding apparatus according to one embodiment of the present invention, the apparatus being used in a facsimile which can print an image read out from a recording medium with an image by an image sensor on another recording medium supplied o printing means, wherein a reception mode is set in the facsimile.

FIG. 1 shows printing means 12 for printing an image on supplied recording medium 10 in accordance with a supplied printing signal, and image sensor 16 for reading an image already printed on another recording medium and for generating a printing signal corresponding to the read-out image.

Printing means 12 is disposed in an upper portion in a housing, not shown, of a facsimile. Image sensor 16 is disposed in a front portion (right end in FIG. 1) in the housing. In this embodiment, each of printing means 12 and image sensor 16 is formed in a slender shape extended in a direction perpendicular to the surface of the drawing paper, and printing means 12 is composed of a thermal head.

First feed roller 18 is disposed under printing means 12 in the housing, not shown. The rotating center line of first feed roller 18 is extended in longitudinal direction of printing means 12, and first feed roller 18 is rotatably supported by a chassis, not shown, in the housing.

In the embodiment described above, recording medium 10 is a rolled thermal sensitive paper. The forward end of recording medium 10, extended from a roll holder, not shown, provided adjacent to first feed roller 18 in the upper portion of the housing, is pinched by first feed roller 18 and printing means 12. The outer peripheral surface of first feed roller 18 is formed of an elastic material and first feed roller 18 functions as a platen for printing means 12. Recording means 10 is drawn from a roll holder, not shown, by rotation of first feed roller 18 in a counterclockwise direction as shown by arrow A in FIG. 1, and moved on printing means 20 toward the rear (leftward in FIG. 1) of the housing, not shown, of the facsimile, as shown by arrow B in FIG. 1. First one-way clutch 20 is mounted on the rotational center shaft of first feed roller 18. First one-way clutch 20 has input gear (input rotary member) 22 at its input side to transmit only a rotational force in the counterclockwise direction transmitted to input gear (input rotary member) 22 to first feed roller 18.

Second feed roller 24 is disposed in the back side of image sensor 16 in the housing, not shown. The rotational center line of second feed roller 24 is extended in the longitudinal direction of image sensor 16, and the second feed roller 24 is rotatably supported by the chassis, not shown, in the housing, not shown.

Image sensor 16 is rockably provided on the chassis, not shown, to come into contact with the outer peripheral surface of second feed roller 24 from obliquely forwardly upward (obliquely rightwardly upward in FIG. 1), and passage 26 for guiding a recording medium with an image (not shown in FIG. 1) from the upside of the housing to a contact line between image sensor 16 and second feed roller 24 is formed in the housing.

Figure 2:
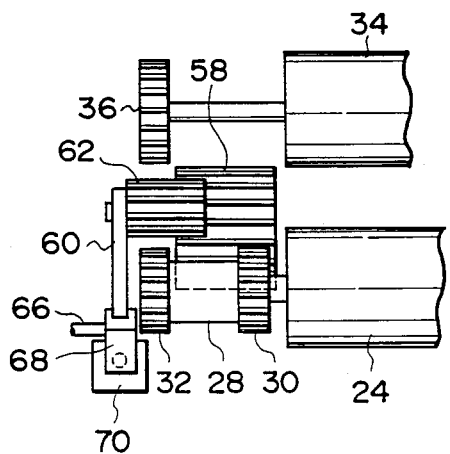
FIG. 2 is a schematic front view showing second and third feed rollers and rotary force transmitting route switching means of the recording medium feeding apparatus of FIG. 1.

Second feed roller 24 is so formed that at least its outer peripheral surface is white, and second one-way clutch 28 is mounted on the rotational center shaft of second feed roller 24. As shown in FIG. 2, second one-way clutch 28 has input gear (input rotary member) 30 at its input side to transmit only a rotational force (FIG. 1) in a clockwise direction, transmitted to input gear (input rotary member) 30, to second feed roller 24. Second one-way clutch 28 further has output gear (output rotary member) 32 at its output side, as shown in FIG. 2. Output gear (output rotary member) 32 is concentrically fixed to the rotational center shaft of second feed roller 24.

Second feed roller 24 can drive the recording medium with the image (not shown in FIG. 1), which is introduced into passage 26 and the forward end of which reaches at the contact line between image sensor 16 and second feed roller 24, to move the recording medium with the image downward on image sensor 16 by its rotation in clockwise direction in FIG. 1.

Third feed roller 34 is disposed at a position along passage 26 above image sensor 16 in the housing. Third feed roller 3 is rotatably supported by the chassis, not shown, so as to dispose its rotational center shaft in parallel with the rotational center shaft of second feed roller 24. Gear 36 is concentrically fixed to the rotational center shaft of third feed roller 34. Gear 36 is substantially disposed in the same plane as input gear (input rotary member) 30 of second one-way clutch 20 is disposed, as shown in FIG. 2.

A bi-directional driving motor 38 is disposed between first feed roller 18 and second feed roller 24 in the housing, not shown. First gear train 42 is interposed between driving pinion 40 concentrically fixed to the output shaft of driving motor 38 and input gear 22 of first one-way clutch 20. Second gear train 43 is interposed between driving pinion 40 of driving motor 38 and input gear 30 of second one-way clutch 28.

First gear train 42 has first rotational force transmitting gear 44 engaged with driving pinion 40 of driving motor 38, second rotational force transmitting gear 46 of small diameter engaged with first rotational force transmitting gear 44, and third rotational force transmitting gear 48 of large diameter concentrically fixed with second rotational force transmitting gear 46 and engaged with input gear 22 of first one-way clutch 20. These gears of first gear train 42 are rotatably supported by the chassis, not shown, described above.

Second gear train 43 has first rotational force transmitting gear 50 engaged with driving pinion 40 of driving motor 38, second rotational force transmitting gear 52 of small diameter engaged with first rotational force transmitting gear 50, third rotational force transmitting gear 54 of large diameter concentrically fixed with second rotational force transmitting gear 52, fourth rotational force transmitting gear 56 of small diameter engaged with third rotational force transmitting gear 54, and fifth rotational force transmitting gear 58 of large diameter engaged with fourth rotational force transmitting gear 56. Fifth rotational force transmitting gear 58 is engaged with input gear 30 of second one-way clutch 28. Fifth rotational force transmitting gear 58 functions as a driving rotary member for transmitting a rotational force from the output shaft 40 of driving motor 38 to input gear 30.

Planetary lever 60 is rotatably mounted on the rotational center shaft of fifth rotational force transmitting gear 58. Planet gear 62 is rotatably supported on one end portion of planetary lever 60 to turn around the rotational center shaft of fifth rotational force transmitting gear 58 remaining in engagement with fifth rotational force transmitting gear 58. Planetary lever 60 is urged to rotate in a direction of the rotation of the fifth rotational force transmitting gear 50 by the inertia of the rotation of the fifth rotational force transmitting gear 58 as the driving rotary member, and planet gear 62 functions as a position change rotary member which varies its position on the fifth rotational force transmitting gear 50 upon rotation of the planetary lever 60.

Planetary gear 62 extends substantially perpendicularly to a plane including output gear 32 of second one-way clutch 28 and gear 36 of third feed roller 34, and output gear 32 and gear 36 are disposed on the moving trace of planet gear 62.

When planet gear 62 is engaged with output gear 32 of second one-way clutch 28, planet gear 62 can transmit a rotational force from fifth rotational force transmitting gear 58 (i.e., rotational force from the output shaft of driving motor 38) to second feed roller 24 by-passing second one-way clutch 28. This is because, as stated above, output gear 32 is fixed to the outer shaft of second feed roller 24. When planet gear 62 is engaged with gear 36 of third feed roller 34, planet gear 62 transmits a rotational force from fifth rotational force transmitting gear 58 (i.e., rotational force from the output shaft of driving motor 38) to gear 36 of third feed roller 34.

Planet gear 62 and planetary lever 60, constructed to switch the rotational force transmitting route in this manner, compose rotary force transmitting route switching means.

Rotational force transmitting route switching control means 63 for controlling the operation of the rotational force transmitting route switching means is provided at the other end of planetary lever 60. In the embodiment described above, switching control means 63 has cutout 64 formed on the peripheral edge of the other end of planetary lever 60, engaging lever 68 attached on rotational center shaft 66 fixed to the chassis, not shown, so as to be rotatable around rotational center shaft 66 between an engaging position in which the one end of engaging lever 68 is disposed in cutout 64 and a disengaging position in which the one end of engaging lever 68 is separated from cutout 64, plunger and solenoid driving means 70 connected to the other end of engaging lever 68 so as to selectively rotate engaging lever 68 between the engaging position and the disengaging position, and electric circuit control means 72 electrically connected to plunger and solenoid driving means 70 and driving motor 38 to control the operations of plunger and solenoid driving means 70 and driving motor 38.

Here, cutout 64, engaging lever 68, plunger and solenoid driving means 70 and electric circuit control means 72 form planetary lever control means for controlling the operation of the rotary force transmitting route switching means by controlling the operation of planetary lever 60. Planetary lever 60 forms position selecting means for selectively controlling the position of planet gear 62 by being selectively controlled as to its own position by switching control means 63.

Cutout 64 is formed to have a shape which inhibits the rotation of planetary lever 60 causing planet gear 62 to engage with output gear 32 of second one-way clutch 28 and allows the rotation of planetary lever 60 causing planet gear 62 to engage with gear 36 of third feed roller 34, while engaging lever 68 is engaged with cutout 64.

In the embodiment of the recording medium feeding apparatus according to the present invention and constructed as described above, when printing means 12 in the facsimile to which the embodiment is applied prints an image on supplied printing medium 10 without an image in accordance with supplied printing signal (i.e., when a reception mode is set in the facsimile), electric circuit control means 72 controls driving motor 38 to rotate its output shaft in the clockwise direction as shown by arrow C in FIG. 1, and controls plunger and solenoid driving means 70 to engage engaging lever 68 with cutout 64 of planetary lever 60 as shown in FIG. 1.

The rotational force of the output shaft of driving motor 38 in the clockwise direction shown by arrow C in FIG. 1 is transmitted to input gear 22 of first one-way clutch 20 and input gear 30 of second one-way clutch 28 through first and second gear trains 42 and 43. At this time, third rotational force transmitting gear 48 of first gear train 42 rotates in the clockwise direction as shown by arrow D in FIG. 1, thereby rotating input gear 22 in the counterclockwise direction as shown by arrow A in FIG. 1. First one-way clutch 20 transmits the rotation of input gear 22 to first feed roller 18.

First feed roller 18 rotated in the counterclockwise direction by the rotational force from the output shaft of driving motor 38 moves recording medium 10 without image in a direction as shown by arrow B in FIG. 1. In accordance with the supplied printing signal, printing means 12 prints an image on recording medium 10 without image moving on printing means 12 in this manner.

When the output shaft of driving motor 38 is rotated in the clockwise direction as described above, fifth rotational force transmitting gear 58 of second gear train 43 is rotated in the clockwise direction as shown by arrow E in FIG. 1, and the clockwise rotation of fifth rotational force transmitting gear 58 causes input gear 30 of second one-way clutch 28 to rotate in the counterclockwise direction. However, second one-way clutch 28 interrupts the transmission of the rotation to first feed roller 18. The clockwise rotation of fifth rotational force transmitting gear 58 also generates an inertia in planetary lever 60, the inertia urging planetary lever 60 to rotate in the clockwise direction. However, engaging lever 68 engaged with cutout 64 of planetary lever 60 prevents planetary lever 60 from rotating in the clockwise direction. As a result, planet gear 62 is held at the substantially intermediate position between input gear 30 of second one-way clutch 28 and gear 36 of third feed roller 34 as shown in FIGS. 1 and 2, where planet gear 62 is separated from both the gears. The positions of planetary lever 60 and planet gear 62 at this time are defined as first positions thereof.

As described above, when the reception mode is set in the facsimile, the rotational force from the output shaft of driving motor 38 is not transmitted to second and third feed rollers 24, 34, so that these rollers 24, 34 are not rotated. Therefore, no loss occurs in the output of driving motor 38. Even if a recording medium with an image is inserted into passage 26 when the reception mode is set in the facsimile, the recording medium with the image is held in passage 26 with its forward end contacting the contact line between second feed roller 24 and image sensor 16, so that the recording medium with the image is prevented from being moved on image sensor 16 by second feed roller 24.

In the embodiment of the recording medium feeding apparatus according to the present invention and constructed as described above, when the image printed or drawn on the recording medium is read out by image sensor 16 in the facsimile and a printing signal corresponding to the read-out image is generated (i.e., a transmission mode is set in the facsimile), at first, recording medium 74 with the image is inserted from above to passage 26. Recording medium 74 with the image is ordinarily a recording sheet on which an image, such as characters, numerals, symbols, or figures, is printed or drawn.

Figure 3:
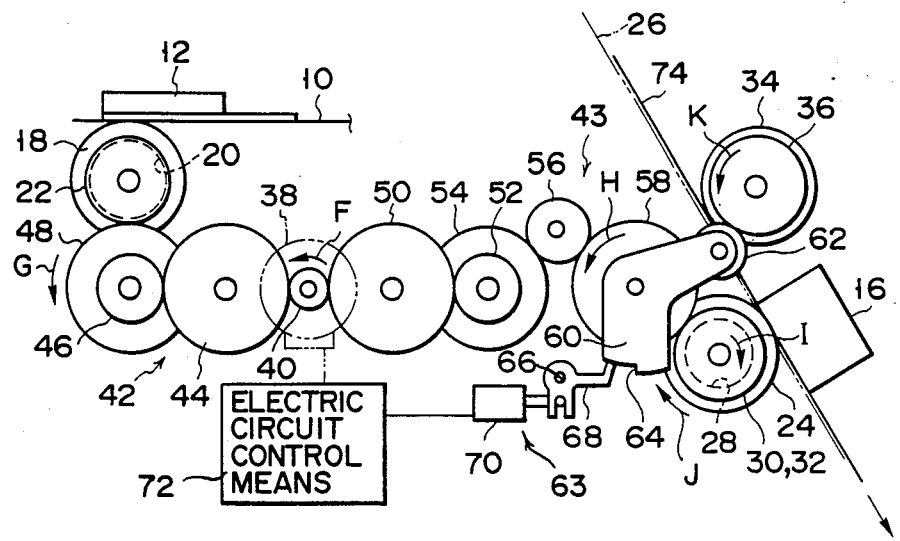
FIG. 3 is a schematic side view which is the same as FIG. 1, wherein a transmission mode is set in the recording medium feeding apparatus of FIG. 1.

When a detecting means, not shown, provided in the entrance opening of passage 26 detects the forward end of recording medium 74 with the image which is inserted into passage 26, electric circuit control means 72 controls the driving motor 38 to rotate its output shaft in the counterclockwise direction as shown by arrow F in FIG. 3, and controls plunger and solenoid driving means 70 to engage engaging lever 68 with cutout 64 of planetary lever 60 as shown in FIG. 3.

The rotational force of the output shaft of driving motor 38 in the counterclockwise direction as shown by arrow F in FIG. 3 is transmitted to input gear 22 of first one-way clutch 20 and input gear 30 of second one-way clutch 28 through first and second gear trains 42 and 43. At this time, third rotational force transmitting gear 48 of first gear train 42 is rotated in the counterclockwise direction as shown by arrow G in FIG. 3, and input gear 22 is thereby rotated in the clockwise direction. First one-way clutch 20 interrupts the transmission of the rotation of input gear 22 to first feed roller 18. As a result, recording medium 10 without image is not moved on printing means 12.

Figure 4:
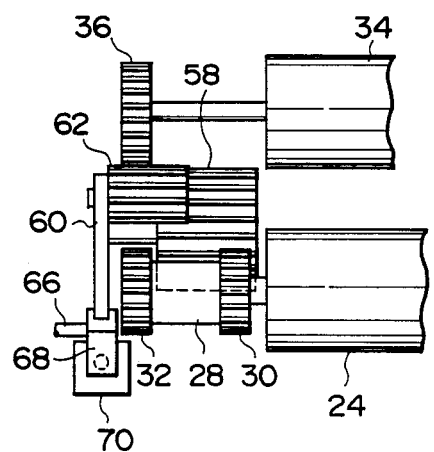
FIG. 4 is a schematic front view showing second and third feed rollers and rotary force transmitting route switching means of the recording medium feeding apparatus of FIG. 3.

When the output shaft of driving motor 38 is rotated in the counterclockwise direction as described above, fifth rotational force transmitting gear 58 of second gear train 43 is rotated in the counterclockwise direction as shown by arrow H in FIG. 3 to cause input gear 30 of second one-way clutch 28 to rotate in the clockwise direction as shown by arrow I in FIG. 3. Second one-way clutch 28 transmits the clockwise rotation of input gear 30 to second feed roller 24 to rotate second feed roller 24 in the clockwise direction as shown by arrow J in FIG. 3. The counterclockwise rotation of fifth rotational force transmitting gear 58 also generates inertial force in planetary lever 60 to urge planetary lever 60 to rotate in the counterclockwise direction. In this case, planetary lever 60 rotates in the counterclockwise direction while keeping the engagement of engaging lever 68 with cutout 64, and the rotation of planetary lever 60 is stopped by engagement of planet gear 62 with gear 36 of third feed roller 34 as shown in FIGS. 3 and 4.

Thus, gear 36 of third feed roller 34 also functions as rotational distance limiting means for limiting the rotational distance of planetary lever 60 to a predetermined value in the counterclockwise direction (i.e., in a direction that planetary lever 60 goes away from second feed roller 24). The positions of planetary lever 60 and planet gear 62 at this time are defined as second positions.

Planet gear 62 disposed at the second position transmits the rotational force from fifth rotational force transmitting gear 58 (i.e., from the output shaft of driving motor 38) to gear 36 of third feed roller 34, thereby rotating third feed roller 34 in the counterclockwise direction as shown by arrow K in FIG. 3.

Recording medium 74 with the image inserted into passage 26, as described above, is fed by third feed roller 34 toward the contact line between image sensor 16 and second feed roller 24. Electric circuit control means 72, which detects the arrival of the forward end of recording medium 74 to the contact line by another detecting means provided immediately before the contact line, stops the rotation of the output shaft of driving motor 38. Then, when a transmission mode is set in the facsimile by a transmission mode setting switch means, not shown, provided in the facsimile, electric circuit control means 72 controls driving motor 38 to rotate again the output shaft thereof in the counterclockwise direction as shown by arrow F. Therefor, the recording medium 74 is driven by second feed roller 24 at the contact line to be moved on image sensor 16. Image sensor 16 reads the image on recording medium 74 with the image and generates a printing signal corresponding to the read out image.

In the embodiment of the recording medium feeding apparatus according to the present invention and constructed as described above, when the image read out from recording medium 74 with the image by image sensor 16 in the facsimile to which the embodiment is applied is printed on another recording medium 10 supplied to printing means 12 (i.e., the copy mode is set in the facsimile), recording medium 74 with the image inserted from above to passage 26 is at first fed by third feed roller 34 until the forward end of recording medium 74 reaches at the contact line between image sensor 16 and second feed roller 24 in the same manner as the transmission mode setting time.

Figure 5:
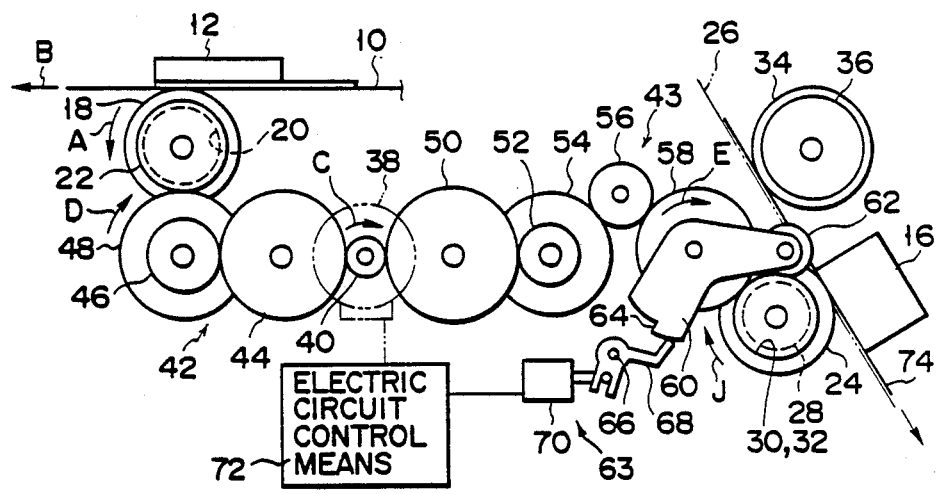
FIG. 5 is a schematic side view which is the same as FIG. 1, wherein a copy mode is set in the recording medium feeding apparatus of FIG. 1.

When the copy mode is set in the facsimile by copy mode setting switch means, not shown, in facsimile while the forward end of recording medium 74 reaches at the contact line, electric circuit control means 72 immediately controls driving motor 38 to rotate the output shaft in the clockwise direction as shown by arrow C in FIG. 5, and controls plunger and solenoid driving means 70 to separate engaging lever 68 from cutout 6 of planetary lever 60 as shown in FIG. 5.

Figure 6:
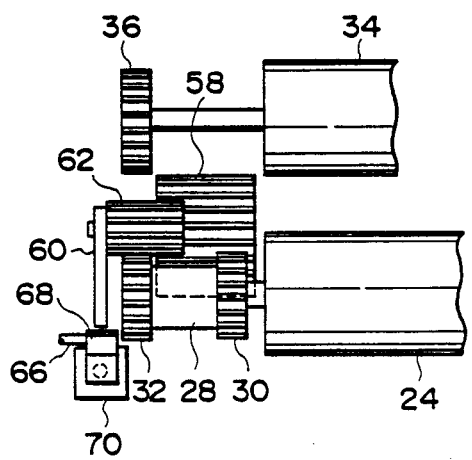
FIG. 6 is a schematic front view showing second and third feed rollers and rotary force transmitting route switching means of the recording medium feeding apparatus of FIG. 5.

The clockwise rotation of the output shaft of driving motor 38 as shown by arrow C in FIG. 5 is transmitted to input gear 22 of first one-way clutch 20 and input gear 30 of second one-way clutch 28 through first and second gear trains 42 and 43. At this time, fifth rotational force transmitting gear 58 of second gear train 43 is rotated in the clockwise direction as shown by arrow E in FIG. 5, and clockwise rotation of fifth rotational force transmitting gear 58 causes input gear 30 of second one-way clutch 28 to rotate counterclockwise. Second one-way clutch 28 interrupts the transmission of the rotation of input gear 30 to second feed roller 24. The clockwise rotation of fifth rotational force transmitting gear 58, however, generates inertial force in planetary lever 60 to urge planetary lever 60 to rotate in the clockwise direction. As a result, planetary lever 60, the cutout 64 of which is not engaged with engaging lever 68, is rotated in the clockwise direction until planet gear 62 is engaged with output gear 32 of second one-way clutch 28 as shown in FIGS. 5 and 6.

The positions of planetary lever 60 and planet gear 62 at this time are defined as third positions.

Planet gear 62 disposed at the third position transmits the rotational force from fifth rotational force transmitting gear 58 (i.e., from the output shaft of driving motor 38) to output gear 32 of second one-way clutch 28 to transmit the rotational force directly to third feed roller 34 thus bypassing one-way clutch 28 and rotating third feed roller 34 in the clockwise direction as shown by arrow J in FIG. 5.

Recording medium 74 with the image inserted into passage 26 as described above is fed by third feed roller 34 toward the contact line between image sensor 16 and second feed roller 24, and is driven by second feed roller 24 at the contact line to be moved on image sensor 16. At this time, image sensor 16 reads the image on recording medium 74 with the image to generate a printing signal corresponding to the read-out image.

When the output shaft of driving motor 38 is rotated in the clockwise direction as described above, third rotational force transmitting gear 48 of first gear train 42 is rotated in the clockwise direction as shown by arrow D in FIG. 5, thereby rotating input gear 22 in the counterclockwise direction as shown by arrow A in FIG. 5. First one-way clutch 20 transmits the rotation of input gear 22 to first feed roller 18.

First feed roller 18 rotated in the counterclockwise direction by the rotational force from the output shaft of driving motor 38 moves recording medium 10 without image in a direction as shown by arrow B in FIG. 5. Printing means 12 prints an image on recording medium 10 without image moved on printing means 12 in accordance with a printing signal generated from image sensor 16.

What is claimed is:

1. A recording medium feeding apparatus which is used in a facsimile, the facsimile having printing means for printing an image on a supplied recording medium in accordance with a supplied printing signal, and an image sensor for reading an image, printed or drawn on a recording medium, and generating a printing signal corresponding to the read-out image, the facsimile also being able to print the image, read out by the image sensor from the recording medium with the image, on another recording medium supplied to the printing means, and the feeding apparatus moving recording mediums on the printing means and the image sensor, respectively, and which comprises a first feed roller for moving the recording medium on the printing means;

a second feed roller for moving the recording medium with the image on the image sensor;

a bi-directional driving motor;

a first one-way clutch means interposed between the driving motor and the first feed roller to transmit the rotational force of the output shaft of the driving motor in one direction to the first feed roller so that the first feed roller is rotated for moving the recording medium on the printing means, and to interrupt the transmission of the rotational force of the output shaft of the driving motor in the other direction to the first feed roller;

a second one-way clutch means interposed between the driving motor and the second feed roller to interrupt the transmission of the rotational force of the output shaft of the driving motor in the one direction to the second feed roller, and to transmit the rotational force of the output shaft of the driving motor in the other direction to the second feed roller so that the second feed roller is rotated for moving the recording medium with the image on the image sensor;

rotational force transmitting route switching means for selectively and directly transmitting the rotational force of the output shaft of the driving motor in the one direction to the second feed roller bypassing the second one way clutch means so that the second feed roller is rotated for moving the recording medium with the image on the image sensor; and rotational force transmitting route switching control means for (a) controlling the driving member to rotate the output shaft thereof in the one direction and controlling the switching means not to directly transmit the rotational force of the output shaft of the driving motor in the one direction to the second feed roller without passing through the second one-way clutch means when the printing means in the facsimile prints an image on the supplied recording medium in accordance with the supplied printing signal, (b) controlling the driving motor to rotate the output shaft thereof in the other direction when the image sensor reads the image printed or drawn on the recording medium with the image and generates a printing signal corresponding to the read-out image, and (c) controlling the driving motor to rotate the output shaft thereof in the one direction and controlling the switching means to directly transmit the rotational force of the output shaft thereof in the one direction to the second feed roller bypassing the second one-way clutch means when an image read out from the recording medium with the image by the image sensor is printed on another recording medium supplied to the printing means, whereby, (a) when the printing means in the facsimile prints an image on the supplied recording medium in accordance with the supplied image signal, the rotational force of the output shaft of the driving motor in the one direction is transmitted only to the first feed roller by means of the first one-way clutch means, the switching means does not transmit the rotational force of the output shaft in the one direction to the second feed roller, and the second one-way clutch means does not transmit the rotational force to the second feed roller, so that the recording medium in moved by the first feed roller on the printing means so as to be printed, and the recording medium with the image is not moved on the image sensor by the second feed roller;

(b) when the image sensor reads the image printed or drawn on the recording medium and generates a printing signal corresponding to the read-out image, the rotational force of the output shaft of the driving motor in the other direction is transmitted to the second feed roller through the second one-way clutch means, the switching means does not transmit the rotational force of the output shaft in the other direction to the second feed roller, and the first one-way clutch means does not transmit the rotational force in the other direction to the first feed roller, so that the recording medium with the image is moved on the image sensor by the second feed roller, and the recording medium is not moved by the first feed roller on the printing means so as to be printed; and (c) when an image read out from the recording medium with the image by the image sensor is printed on another recording medium supplied to the printing means, the rotational force of the output shaft of the driving motor in the one direction is transmitted to the first feed roller through the first one-way clutch means, and the switching means directly transmits the rotational force of the output shaft in the one direction to the second feed roller bypassing the second one-way clutch means, so that the recording medium with the image is moved on the image sensor by the second feed roller and the other recording medium is moved by the first feed roller on the printing means so as to be printed.

2. A recording medium feeding apparatus according to claim 1, wherein said second feed roller has its axis disposed perpendicular to a feeding direction in which the recording medium with the image traverses the image sensor, said second feed roller and said image sensor being positioned to pinch the recording medium with the image therebetween.

3. A recording medium feeding apparatus according to claim 1, wherein said second one-way clutch means comprises an input rotary member and an output rotary member at the input and output sides and the rotational force form the output shaft of said driving motor is always transmitted to said input rotary member, said switching means comprises a position moving rotary member to which the rotational force from the output shaft of said driving motor is always transmitted and which moves between first and second positions which are different from each other, and position selecting means controlled by said switching control means to selectively move said position moving rotary member between first and second positions, said position moving rotary member, at said first position, being spaced from said second feed roller so as not to transmit said rotational force to said second feed roller and, at said second position, contacts the output rotary member of said second one-way clutch means to rotate said second feed roller, wherein said position selecting means:

(a) is controlled by said switching control means to move said position moving rotary member to said first position when said printing means in the facsimile prints an image on the supplied recording medium in accordance with the supplied printing signal and when the image sensor in the facsimile reads the image printed or drawn on the recording medium and generates a printing signal corresponding to the read-out image, and (b) is controlling by said switching control means to move said position moving rotary member to said second position when the image read out from the recording medium with the image by the image sensor is printed on another recording medium supplied to the printing means.

4. A recording medium feeding apparatus according to claim 3, wherein said recording medium feeding apparatus further comprises a driving rotary member to which is always transmitted the rotational force from the output shaft of said driving motor, and which always contacts the input rotary member of said second one-way clutch means to transmit the rotational force to the input rotary member, said position moving rotary member is supported by a planetary lever rotatably mounted on the rotational center of said driving rotary member to revolve around the rotational center of said driving rotary member while keeping contact between said position moving rotary member and the peripheral surface of said driving rotary member to transmit the rotational force from the driving rotary member to said position moving rotary member, and said switching control means comprises planetary lever control means for selectively moving the planetary lever between first and second positions in response to the movement of said position moving rotary member between the first and second positions.

5. A recording medium feeding apparatus according to claim 4, wherein said planetary lever control means comprises a planetary lever with a cutout formed on the peripheral edge of said planetary lever and engaging means being movable between an engaging position in which the engaging means engages with the cutout and a disengaging position in which the engaging means disengages from the cutout, said cutout is formed to have a shape which allows said planetary lever to move from said first position in a direction opposite to the direction from said first position to said second position and inhibits said planetary lever to move from said first position to said second position, while said engaging means is engaged with the cutout, said planetary lever is so energized as to rotate in a rotating direction of said driving rotary member by the inertial force of the rotation of said driving rotary member, and said recording medium feeding apparatus further comprises rotating distance limiting means for limiting the rotating distance of said planetary lever in the direction opposite to the direction from said first position to said second position to a predetermined distance.

6. A recording medium feeding apparatus according to claim 5, wherein said rotating distance limiting means comprises a third feed roller which is provided at a position spaced from said image sensor to feed the recording medium with the image toward said image sensor and contacts said position moving rotary member provided on said planetary lever to transmit the rotational force from said driving rotary member through said position moving rotary member when said planetary lever is rotated over a predetermined distance in the direction opposite to the direction from said first position to said second position.

7. A recording medium feeding apparatus which is used in a facsimile, the facsimile having printing means for printing an image on a supplied recording medium in accordance with a supplied printing signal, and an image sensor for reading an image, printed or drawn on a recording medium, and generating a printing signal corresponding to the read-out image, the facsimile also being able to print the image, read out by the image sensor from the recording medium with the image, on another recording medium supplied to the printing means, and the feeding apparatus moving recording mediums on the printing means and the image sensor, respectively, and which comprises a first feed roller for moving the recording medium on the printing means;

a second feed roller for moving the recording medium with the image on the image sensor;

a third rotatable feed roller provided at a position spaced from the image sensor to feed the recording medium with the image toward the image sensor;

a bi-directional driving motor;

a first one-way clutch means interposed between the driving motor and the first feed roller to transmit the rotational force of the output shaft of the driving motor in one direction to the first feed roller so that the first feed roller is rotated for moving the recording medium on the printing means, and to interrupt the transmission of the rotational force of the output shaft of the driving motor in the other direction to the first feed roller;

a second one-way clutch means interposed between the driving motor and the second feed roller to interrupt the transmission of the rotational force of the output shaft of the driving motor in the one direction to the second feed roller, and to transmit the rotational force of the output shaft of the driving motor in the other direction to the second feed roller so that the second feed roller is rotated for moving the recording medium with the image on the image sensor;

rotational force transmitting route switching means for selectively and directly transmitting the rotational force of the output shaft of the driving motor in the one direction to the second feed roller bypassing the second one way clutch means and transmitting the rotational force of the output shaft of the driving motor in the other direction to the third feed roller so that the third feed roller is rotated for moving the recording medium with the image on the image sensor; and rotational force transmitting route switching control means for (a) controlling the driving motor to rotate the output shaft thereof in the one direction and controlling the switching means not to directly transmit the rotational force of the output shaft of the driving motor in the one direction to the second feed roller without passing through the second one-way clutch means when the printing means in the facsimile prints an image on the supplied recording medium in accordance with the supplied printing signal, (b) controlling the driving motor to rotate the output shaft thereof in the other direction when the image sensor reads the image printed or drawn on the recording medium with the image and generates a printing signal corresponding to the read-out image, and (c) controlling the driving motor to rotate the output shaft thereof in the one direction and controlling the switching means to directly transmit the rotational force of the output shaft thereof in the one direction to the second feed roller bypassing the second one-way clutch means when an image read out from the recording medium with the image by the image sensor is printed on another recording medium supplied to the printing means, whereby, (a) when the printing means in the facsimile prints an image on the supplied recording medium in accordance with the supplied image signal, the rotational force of the output shaft of the driving motor in the one direction is transmitted only to the first feed roller by means of the first one-way clutch means, the switching means does not transmit the rotational force of the output shaft in the one direction to the second and third feed rollers, and the second one-way clutch means does not transmit the rotational force in the one direction to the second feed roller, so that the recording medium is moved by the first feed roller on the printing means so as to be printed, and the recording medium with the image is not fed to the image sensor and is not moved on the image sensor by the third and second feed rollers;

(b) when the image sensor reads the image printed or drawn on the recording medium and generates a printing signal corresponding to the read-out image, the rotational force of the output shaft of the driving motor in the other direction is transmitted to the second feed roller through the second one-way clutch means, the switching means does not transmit the rotational force of the output shaft in the other direction to the third feed roller, and the first one-way clutch means does not transmit the rotational force in the other direction to the first feed roller, so that the recording medium with the image is fed toward the image sensor by the third feed roller and is moved on the image sensor by the second feed roller, and the recording medium is not moved by the first feed roller on the printing means so as to be printed; and (c) when an image read from the recording medium with the image by the image sensor is printed on another recording medium supplied to the printing means, the rotational force of the output shaft of the driving motor in the one direction is transmitted to the first feed roller through the first one-way clutch means, the switching means directly transmits the rotational force of the output shaft in the one direction to the second feed roller bypassing the second one-way clutch means, and the switching means does not transmit the rotational force of the output shaft in the one direction to the third roller, so that the recording medium with the image is moved on the image sensor by the second feed roller and the other recording medium is moved by the first feed roller on the printing means so as to be printed.

8. A recording medium feeding apparatus according to claim 7, wherein said second feed roller has its axis disposed perpendicular to a feeding direction in which the recording medium with the image traverses the image sensor, said second feed roller and said image sensor being positioned to pinch the recording medium with the image therebetween.

9. A recording medium feeding apparatus according to claim 7, wherein said second one-way clutch means comprises an input rotary member and an output rotary member at the input and output sides and the rotational force from the output shaft of said driving motor is always transmitted to said input rotary member, said switching means comprises a position moving rotary member to which the rotational force from the output shaft of said driving motor is always transmitted and which moves between first and third positions through a second position all of which are different from each other, and position selecting means controlled by said switching control means to selectively move said position moving rotary member between first and third positions through the second position, said position moving rotary member, at said first position, being spaced from said third feed roller and said second one-way clutch means so as not to transmit and rotational force to said third feed roller and said second one-way clutch means, contacts the third feed roller to rotate the third feed roller at said second position, and contacts the output rotary member of said second one-way clutch means at said third position to rotate said second feed roller, wherein said position selecting means:

(a) is controlled by said switching control means to move said position moving rotary member to said first position when said printing means in the facsimile prints an image on the supplied recording medium in accordance with the supplied printing signal, (b) is controlled by said switching control means to move said position moving rotary member to said second position when the image read out form the recording medium with the image by the image sensor is printed on another recording medium to the printing means, and (c) is controlled by said switching control means to move said position moving rotary member to said third position when the image sensor reads the image printing or drawn on the recording medium and generates a printing signal corresponding to the read-out image.

10. A recording medium feeding apparatus according to claim 9, wherein said recording medium feeding apparatus further comprises a driving rotary member to which is always transmitted the rotational force from the output shaft of said driving motor, and which always contacts the input rotary member of said second one-way clutch means to transmit the rotational force to the input rotary member, said position moving rotary member is supported by a planetary lever rotatable mounted on the rotational center of said driving rotary member to revolve around the rotational center of said driving rotary member while keeping contact between said position moving rotary member and the peripheral surface of said driving rotary member to transmit the rotational force from the driving rotary member to said position moving rotary member, and said switching control means comprises planetary lever control means for selectively moving the planetary lever between first and third positions through second positions in response to the movement of said position moving rotary member between the first and third positions through the second position.

11. A recording medium feeding apparatus according to claim 10, wherein said planetary lever control means comprises a planetary lever with a cutout formed on the peripheral edge of said planetary lever and engaging means being movable between an engaging position in which the engaging means engages with the cutout and a disengaging position in which the engaging means disengages from the cutout, said cutout is formed to have a shape which allows said planetary lever to move from said first position in a direction opposite to the direction from said first position to said second position and inhibits said planetary lever to move from said first position to said third position, while said engaging means is engaged with the cutout, and said planetary lever is so energized as to rotate in a rotating direction of said driving rotary member by the inertial force of the rotation of said driving rotary member.

* * * * *

UNITED STATES PATENT AND TRADEMARK OFFICE
CERTIFICATE OF CORRECTION

PATENT NO. : 4,866,531
DATED : September 12, 1989
INVENTOR(S) : KOBORI et al

It is certified that error appears in the above-identified patent and that said Letters Patent is hereby corrected as shown below:

In the title page, delete the following:

"[30] Foreign Application Priority Data

Dec. 11, 1986 [JP]  Japan..........61-295210"

Signed and Sealed this

Twenty-seventh Day of August, 1991

Attest:

HARRY F. MANBECK, JR.

*Attesting Officer*

*Commissioner of Patents and Trademarks*